Figure 1:
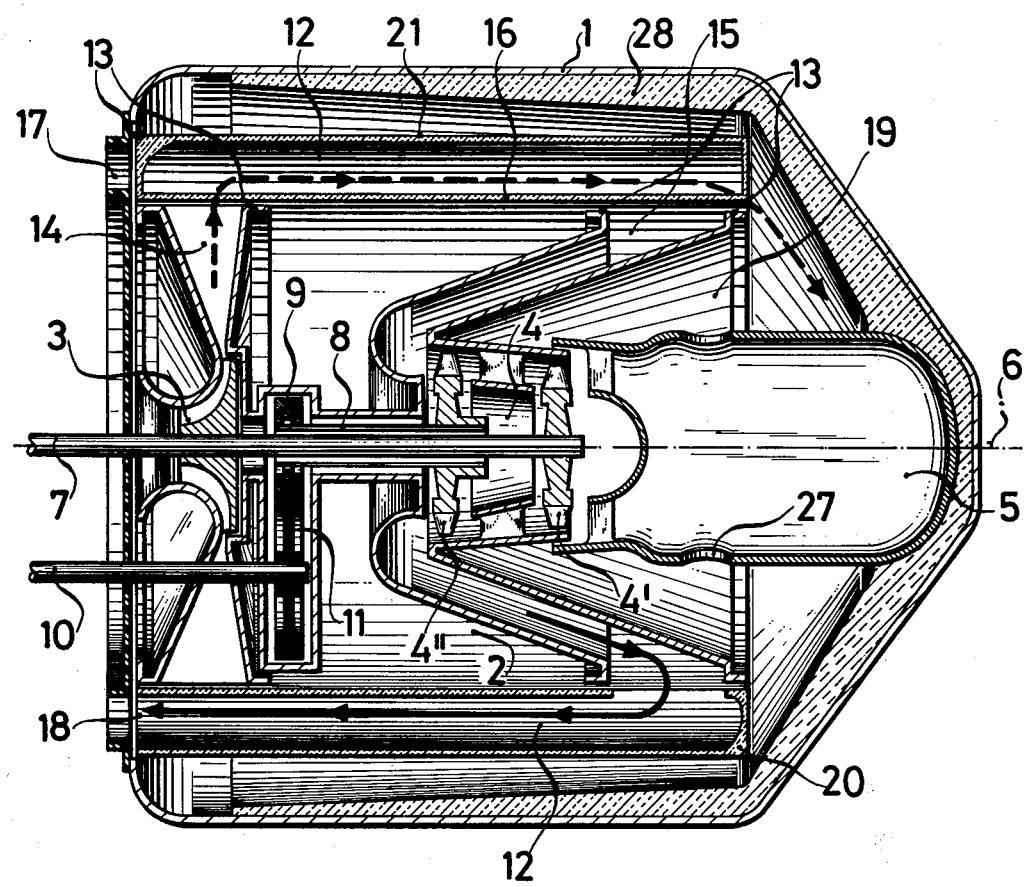

United States Patent [19]

Förster et al.

[11] 4,213,297
[45] Jul. 22, 1980

[54] VEHICULAR PROPULSION GAS TURBINE MOTOR

[75] Inventors: Siegfried Förster, Alsdorf; Günter Hewing, Jülich; Manfred Kleemann, Bergheim, all of Fed. Rep. of Germany

[73] Assignee: Kernforschungsanlage Jülich Gesellschaft mit beschränkter Haftung, Jülich, Fed. Rep. of Germany

[21] Appl. No.: 948,245

[22] Filed: Oct. 3, 1978

[30] Foreign Application Priority Data

Oct. 6, 1977 [DE] Fed. Rep. of Germany ....... 2744899

[51] Int. Cl.² .................................................. F02C 7/08
[52] U.S. Cl. .................................. 60/39.51 R; 165/51
[58] Field of Search .................. 60/39.51 R, 39.51 H; 165/4, 51, DIG. 8

[56] References Cited

U.S. PATENT DOCUMENTS

| | | | |
|---|---|---|---|
| 3,818,984 | 6/1974 | Nakamura | 60/39.51 R |
| 3,831,374 | 8/1974 | Nicita | 60/39.51 R |
| 3,907,457 | 9/1975 | Nakamura | 60/39.51 R |
| 4,070,825 | 1/1978 | Kronogand | 60/39.51 R |

Primary Examiner—Louis J. Casaregola
Attorney, Agent, or Firm—Flynn & Frishauf

[57] ABSTRACT

Elongated ceramic heat exchange units are arranged with each such unit axially oriented and all arranged parallel to each other in a ring surrounding the compressor, gas turbine and combustion chamber of a gas turbine motor. Each heat exchange unit has a multiplicity of rectangular slot channels through alternate ones of which the hot exhaust gas and the compressed air supply flow in counter-current. The cross sections of these channels all have their long dimension disposed substantially radially with respect to the axis of symmetry common to the principal components. The respective inputs for the two sets of channels are both from the inside of the ring arrangement but at opposite ends of each heat exchanger element; whereas the exit openings are in the end faces of the heat exchanger elements. The outlets for the compressed gas that has been heated in the heat exchanger communicate with a space that not only leads the compressed air to the compressed chamber but also allows the compressed air to reach space between the outside of the heat exchanger and an external casing, so as to cause the compressed air to apply its pressure to the heat exchanger elements tightening the seals between them and between each element and the input ducts on the inside of the ring. The same air pressure also applies an axial force to the heat exchanger elements, tightening the seals between them and the discharge duct for the exhaust gas. When the engine is not operating, the absence of this pressure facilitates replacement of a heat exchanger element.

12 Claims, 5 Drawing Figures

VEHICULAR PROPULSION GAS TURBINE MOTOR

This invention concerns a vehicular gas turbine motor in which a recuperative heat exchanger is used for preheating compressed input gases, with heat from the hot spent gases that come out of a turbine fed by the output of a combustion chamber.

Recuperative heat exchangers are commonly referred to as "regenerative" heat exchangers although the term "recuperative" seems to be more accurately descriptive of their function.

In such gas turbine motors, the hot discharge or exhaust gas flows through the heat exchanger in countercurrent to the compressed input gas for the combustion chamber. In the kind of gas turbine motor with which the present invention is concerned, the gas turbine, compressor and combustion chamber are so arranged in a casing that they have a common axis of symmetry and the recuperative heat exchanger is made of a multiplicity of ceramic heat exchanger elements arranged in a ring around the compressor, gas turbine and combustion chamber. Sealing means are provided between the heat exchanger elements of such a ring-type exchanger.

Gas turbine motors of this kind are of great interest for vehicle propulsion because the problems of meeting the rising requirement standards regarding preserving the cleanliness of the surrounding atmosphere are less acute in the case of turbine exhaust gases. Operating temperatures for the gas at the input to the turbine above 1,000° C. are necessary, however, for gas turbine motors usable in vehicles, in order to keep the efficiency high and the size of the equipment as small as possible. The efficiency of a gas turbine depends essentially upon the efficiency of the heat exchanger which makes useful the residual energy still contained in the hot exhaust gases for preheating the combustion-supporting air sucked in and compressed by the compressor. By the efficiency of the heat exchanger is meant the amount of heat actually transferred by the heat exchanger, compared to the amount of heat that could theoretically be transferred by an infinite heat exchanging surface. Because of the high temperature of the hot gas side of the heat exchanger, only metals of high heat resistance or ceramic materials come into consideration as construction materials.

Heat exchanger surfaces of considerable size are necessary for recuperative heat exchangers of high efficiency. The previously recommended tube-type heat exchangers require a great deal of space in a vehicle. Cross-flow heat exchangers of a plate type of construction have also been tried out (as described in "Problems of the Heat Exchanger for Vehicular Gas Turbines" by E. T. Tiefenbacher in ASME Publication 76-GT-105, 1976). Substantial problems regarding the control of the thermal stresses acting on the heat exchanger matrix were found in these efforts.

In order to avoid these disadvantages, it is known to equip vehicular gas turbine motors with heat exchangers that operate regeneratively. Such known heat exchangers consist of ceramic elements in the form of discs that are driven in rotation. The discs revolve between open type segments of the discharge gas ducting on the one hand, and open pipes of the compressed combustion-supporting air ducting on the other, so that in alternation there is a heating up and a cooling off of sectoral regions of the discs, corresponding to a zone where the air supply is heated up and a zone where the exhaust gas is cooled (as described in the above-mentioned reference). There are substantial difficulties in the technological design of the ceramic discs that are heavily stressed in their constant alternation, by sectors, of heating and cooling. Furthermore, rotary heat exchangers of this type do not lend themselves to satisfactory sealing on account of the substantial pressure differences between the heating up and cooling off zones and on account, also, of the high operating temperatures. The sealing strips wear out rapidly.

According to a proposal of the German patent application OS 27 12 136.4 published after the priority date claimed in the present application, there has been set forth an arrangement of recuperative heat exchanger elements of ceramic material arranged in a ring around compressor, gas turbine and combustion chamber, all of which have a common axis of symmetry. This arrangement of the components of the gas turbine motor leads to compact assemblies in which, along with considerable space saving, there is the advantage that all components of the gas turbine motor have good accessibility for assembly or repair work. Care must be taken in such an arrangment, however, to provide for replacement of the highly stressed ceramic heat exchanger elements in some simple way and the gas ducts must be able to be connected in gas-tight fashion in order to prevent power losses.

THE PRESENT INVENTION

It is an object of the present invention to provide a gas turbine motor having recuperative ceramic heat exchanger elements in which these elements can be assembled and are accessible in a simple way and, at the same time, to meet the requirements for a gas-tight connection to the heat-exchanger elements through the high-pressure and low-pressure gas ducts. It is a further object of the invention to simplify the gas ducting between the heat exchanger elements on the one hand and the other components of the gas turbine motor on the other hand. Still another object of the invention is to provide at the same time a compact gas turbine motor construction.

Briefly, the compressed gas and the exhaust gas are supplied at opposite ends of the heat exchanger elements and, in each case, flowing perpendicularly from the inner space toward the respective surfaces or sides of the heat exchanger elements facing the inner space enclosed by the ring arrangement of the heat exchanger elements. The compressed gas and the exhaust gas then flow toward opposite ends of each of the heat exchanger elements, hence in opposite directions, the supply direction of the gases and the flow direction of the heat exchanger being at right angles to each other in both cases. Significantly, the pressure of the compressed gas produced by the compression is brought to bear against the outside and open end of the heat exchanger ring in order to improve the supporting and sealing of the heat exchanger ring against an outer casing, which is preferably provided with heat insulation.

The connection of the gas ducts to the heat exchanger elements in this fashion, together with the application of pressure by the compressed gas to the outer sides of the heat exchanger elements (opposite the sides thereof from which the gases are supplied to the structure) leads to an automatic sealing of the ring of side-by-side heat exchanger elements embedded in sealing material. At the same time, this arrangement leads to automatic sealing of the connections between the heat exchanger elements and the exhaust gas ducts leading away the exhaust gas after the heat exchange operation. As the result of the pressure differences between the compressed gas flowing away and the exhaust gas flowing away, respectively, at opposite ends of the heat exchanger elements, there is produced a stress force in the direction of the outflowing exhaust gas which is utilized for the sealing of the heat exchanger elements at the place where the exhaust gas is led away from the heat exchanger.

The heat exchanger elements are, at the same time, sealed against each other by the application of pressure to their outer surfaces by the compressed gas. In an advantageous manner, therefore, both the ring of heat exchanger elements itself and, also, the previously mentioned connection places between the heat exchanger elements and the gas ducting are sealed the more effectively, the higher the compression that is provided for the compressed gas. When the gas turbine motor is not in operation, and there is no pressure at all, therefore, the individual heat exchanger elements are accordingly capable of being assembled or removed without difficulty in a simple way.

The subjection of the heat exchanger elements to the pressure of the compressed gas in the manner above described is facilitated by arranging for "dead" space, between casing and heat exchanger ring to communicate, around the end of the heat exchanger elements, with the gas input to the combustion chamber. As a further development it is particularly convenient to arrange this by having the portion of the casing that surrounds the heat exchanger elements to continue so as to enclose a space around the end of the heat exchanger elements and over to the combustion chamber so that no special sealed connection of a gas duct at this place is required. In order to make the heat losses as small as possible, the casing portion here under discussion is preferably provided with heat insulation.

Figure 2:
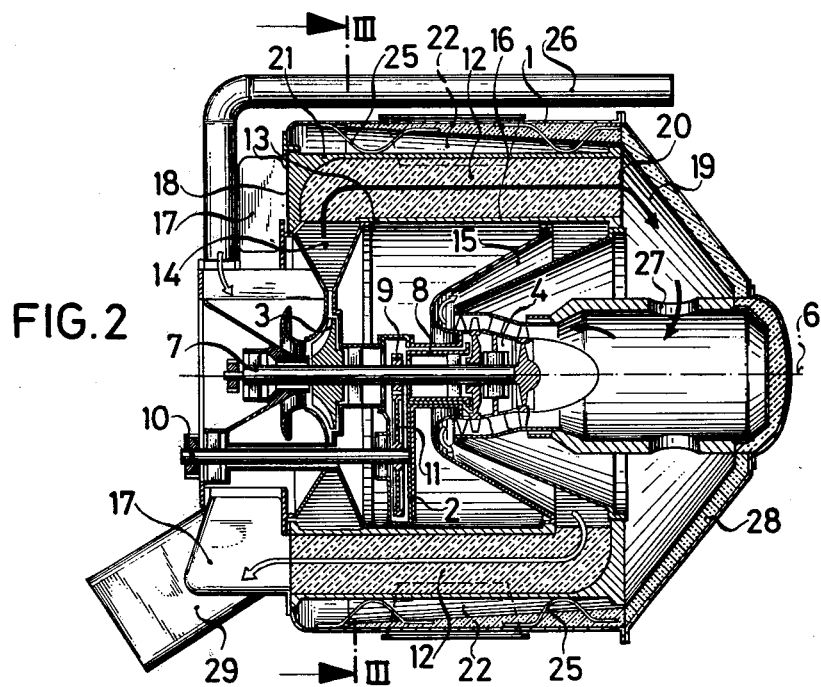
Figure 3:
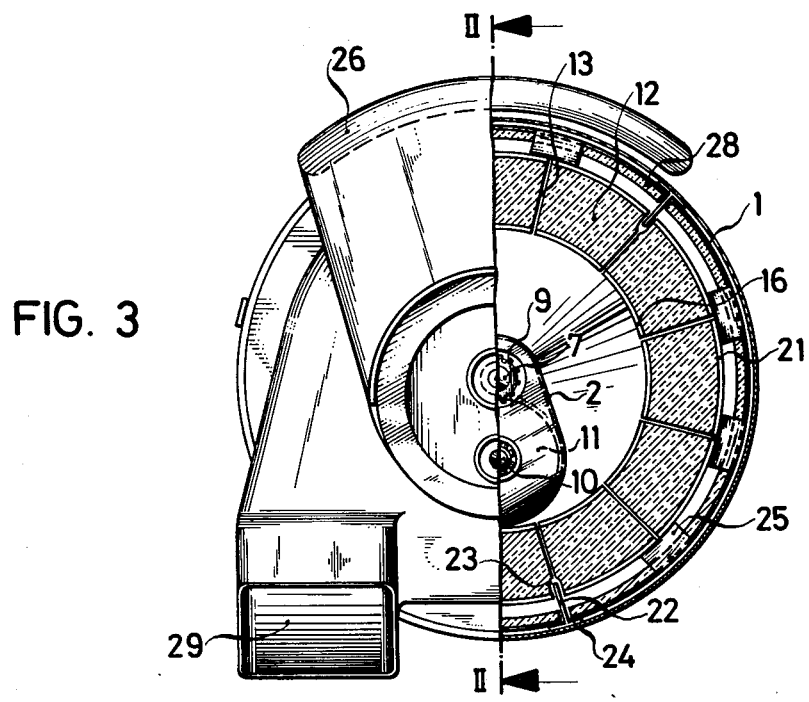
Figure 4:
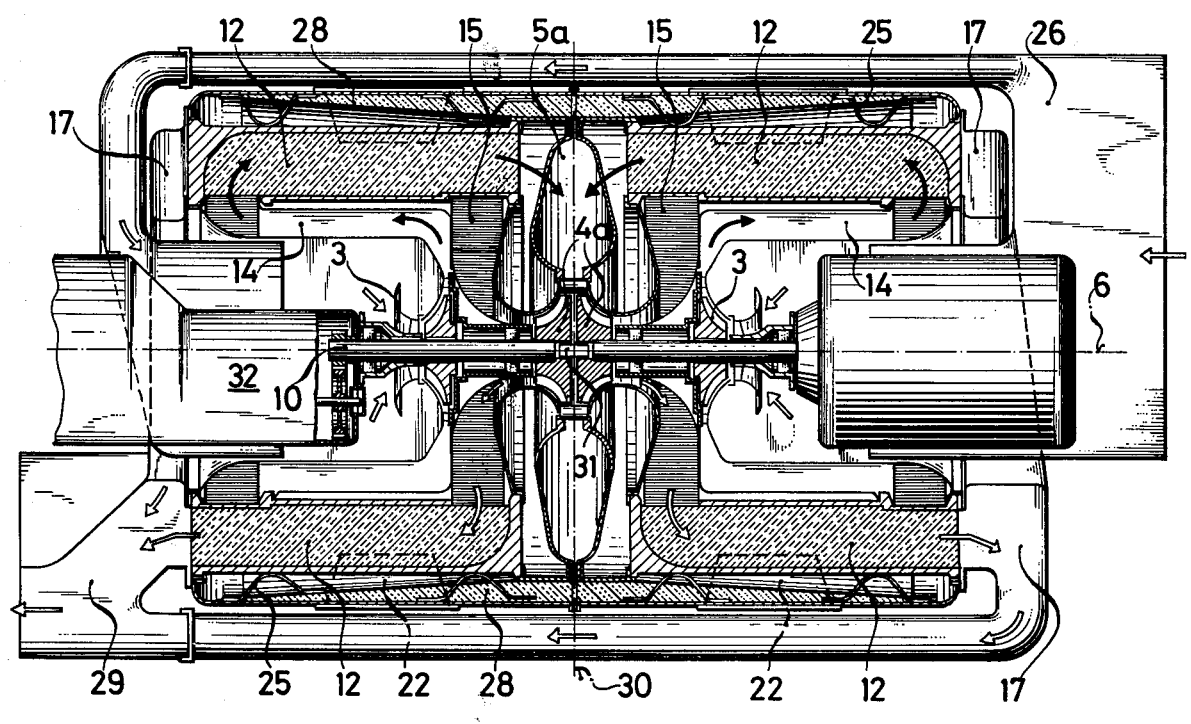
Figure 5:
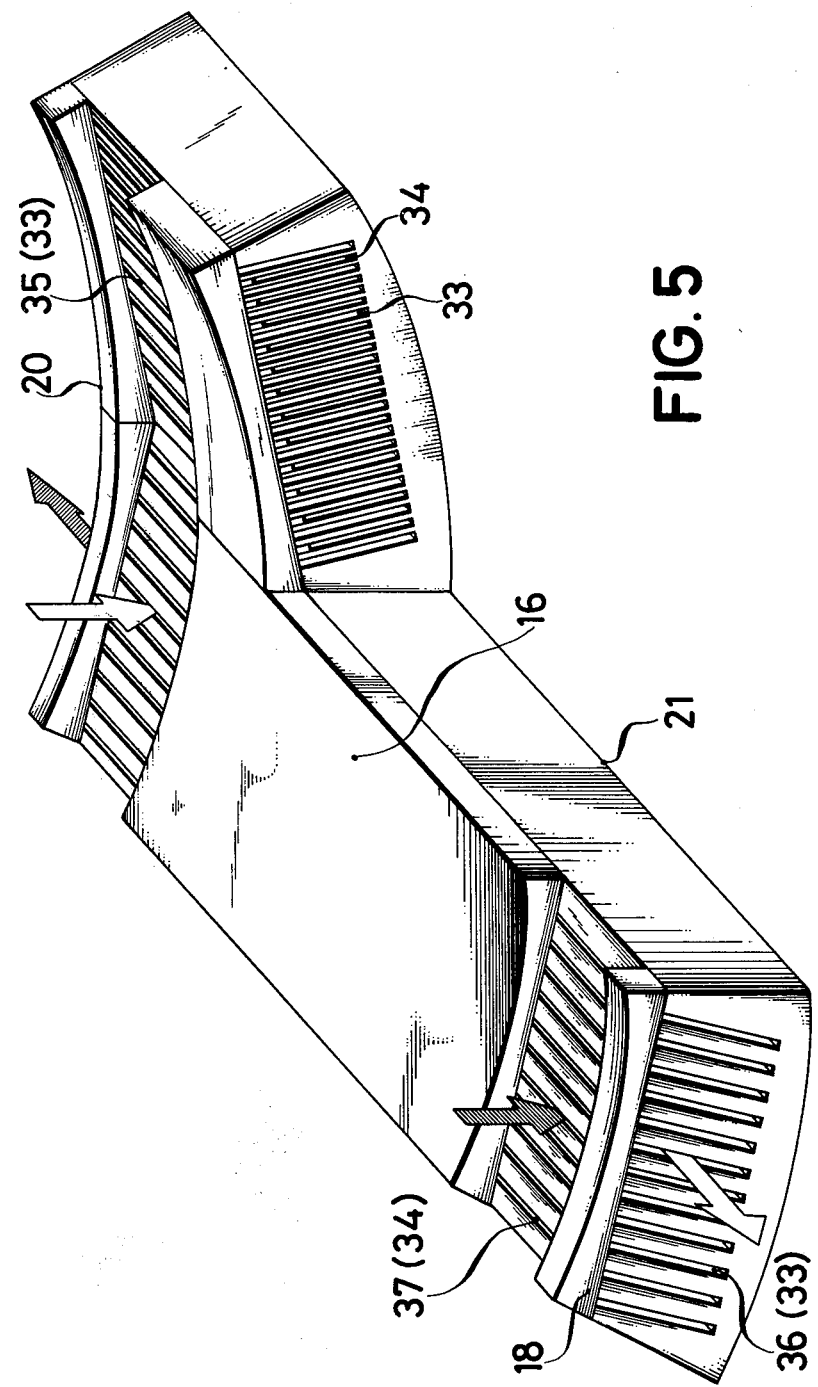

The invention is further described by way of illustrative examples with reference to the annexed diagrammatic drawings, in which:

FIG. 1 is a simplified diagram in the form of a section through the axis of symmetry of a motor having a pot-shaped combustion chamber;

FIGS. 2 and 3 respectively show, in more detail than FIG. 1, a longitudinal section and end view half in transverse section and half in elevation of a gas turbine motor having a pot-shaped combustion chamber, the section plane of FIG. 2 being indicated by the line II—II in FIG. 3, and the section plane of FIG. 3 being indicated by the line III—III of FIG. 2:

FIG. 4 is a longitudinal section of a gas turbine motor having an annular combustion chamber; and FIG. 5 is a diagrammatic perspective view of one heat exchanger element, with an adjacent heat exchanger element partly cut away, of the kind utilized in the gas turbine motors illustrated in FIGS. 1–4.

The drawings show—particularly FIG. 1—a compressor 3 and a gas turbine 4 with their mountings and bearings provided in the space enclosed in an outer motor casing 1 in such a way that compressor, gas turbine, combustion chamber 5 of the motor have a common axis of symmetry 6. In the illustrative embodiments shown in the drawings, a high pressure stage 4' of the two-stage gas turbine 4 and the compressor 3 form one turbo-unit. The high-pressure stage 4' drives the compressor 3 by means of a drive shaft 7. The low-pressure stage 4" of the gas turbine 4 serves to operate the vehicle drive. The rotor of the low-pressure stage is mounted on a hollow shaft 8 which carries a pinion 9 that engages with a spur gear 11 that in turn is affixed to a drive shaft 10. The combustion chamber 5 that supplies the hot gas for the gas turbine 4 of the motor can be constituted as a pot-type combustion chamber as shown in FIG. 2, or as a ring-type combustion chamber shown at 5a in FIG. 4, which may be described as annular or troidal. The fuel supply for the combustion chamber 5 is not specifically shown in the drawings, but must, of course, be understood to be provided. Such provisions are well understood and need not be specifically described here.

Ceramic heat exchanger elements 12 are mounted in an annular array to constitute the recuperative heat exchanger surrounding the compressor 3 gas turbine 4 and combustion chamber 5. The individual heat exchanger elements 12 form a closed ring encircling the other operating components of the gas turbine motor and seals 13 are inserted between the individual side-by-side heat exchanger elements and between these elements and adjacent casings and gas duct structures. In the illustrated case, the sealing means 13 are of a material built up on a base of ceramic fibers. Instead of such seal, it is also possible to use, for example, similar inserts of asbestos. The sealing means 13 close up the spaces between the adjacent side surfaces of neighboring heat exchanger elements 12. At one end of the ring of heat exchanger elements 12, on the inside of the ring, is a compressed gas duct 14 that lead the compressed gas from the compressor 3 to the heat exchanger elements and, similarly, at the other end the discharge or exhaust gas duct 15 which lead the still-hot discharged gas flowing from the gas turbine 4 to the heat exchanger elements.

The media in heat exchanging relation pass through the heat exchanger elements in counter-current, the cooled exhaust gas being led away at one end by discharge duct 17 and connected to an end of the heat exchanger element array, adjacent to the compressed gas input 14 on the inside of the array at the same end. This end face of the heat exchanger element array is designated 18 in the drawings. Sealing material 13 is inserted at the respective connection locations where the compressed gas duct 14 and, the exhaust gas ducts 15 and 17 make connection with the heat exchanger elements, these sealing means again consisting of a sealing material of a ceramic fiber base. The compressed gas conduit 19 for the heated compressed gas is constituted in the illustrated examples, as is particularly apparent in FIG. 1, by the wall of the outer casing portion 1 of the gas turbine motor on the one hand, and by the wall of the exhaust gas duct 15 closing off the inner space 2 all the way to the combustion chamber 5. The hot compressed gas flows through each element 12, in countercurrent to the exhaust gas which it cools towards the end face 18 of the heat exchanger elements (the end face opposite to the end face 20) and exits straight out into a space within the outer casing portion 1. As shown in the drawings, this space within the outer casing portion extends in one direction as the duct 19, already described, and also extends around the outside of the heat exchanger elements to pressure on their outer lateral surfaces 21, which is to say on the outer surfaces of the ring array of the heat exchanger elements. The applied force produced by the over pressure in the space serving as the compressed gas duct 19 presses together the side-by-side heat exchanger elements, and thus produces a sealing of the ring of heat exchanger elements against the inner space 2 surrounded by the ring of elements. Furthermore, as the result of this higher pressure, the heat exchanger elements are, also, pressed against the exhaust gas duct 17 so that this connection also is automatically closed tight during operation of the gas turbine motor. The applied pressure thus produced advantageously increases with increasingly high setting or generation of the pressure level of the compressed gas.

For maintaining the coaxial relation of the heat exchanger element array in the casing, as a further development of the invention, centering members 22 are provided on the inside of the outer casing portion 1, which members fit into cavities 23 provided on the outer lateral surfaces 21 of the heat exchanger elements 12. The centering members 22 are pressed through slot-shaped openings 24 in the outer casing portion 1, down into the cavities 23, after the outer casing portion has been slipped over the ring of heat exchanger elements 12. For trouble-free centering of the ring, three centering members 22 are provided having an elongated shape orientated essentially in the axial direction, insertable in openings 24 in the casing portion 1 that are arranged at 120° angular offsets from each other. The centering members 22 are screwed into the outer casing portion 1.

In order to hold the heat exchanger elements in position even when the motor is at rest, the outer casing portion 1 preferably also has supporting holder elements 25 resiliently engaging the outer surface 21 of the heat exchanger structure. The holders 25 are fastened on the inner side of the casing portion 1. They are constituted as resiliently acting supports, in a manner which will not limit or impair the pressure effect of the compressed gas on the outer lateral surface 21 of the heat exchanger.

The compressed gas duct 14 and the exhaust gas duct 15, as shown in the drawings, have automatically effective seals against that lateral surface 16 of the heat exchanger which faces the inner space encircled by the heat exchanger ring. These seals (for example, lip type seals are particularly to be recommended) will become effective as the result of higher pressure in the gas ducts than in the inner space 2 and likewise the higher pressure of the gas in the gas conduit path 19 compared to that in the exhaust gas duct 15. In the illustrated examples, the rims of the respective connections of the compressed gas ducts 14 and of the exhaust gas ducts 15 are elastically distorted when the ring of heat exchanger element 12 is put in place over them and these rims press against the heat exchanger elements as the result of their restoring force. In order to obtain this result, the respective rotation-symmetrical walls of the compressed gas duct 14 and of the exhaust gas duct 15 have rim collars in the illustrated example that press sealing means 13 against the ring of heat exchanger elements (FIG. 2). The walls of the exhaust gas duct 15 are formed in a sort of frustoconical shape, so that in each case the rim of the base surface of the cone frustum is positioned so as to support the seals 13 against the ring heat exchanger elements.

In operation of the gas turbine motor, air is sucked by the compressor 3 through a suction pipe or horn 26. The compressed gas is preheated in the heat exchanger element 12 and then flows through the space forming the gas duct 19 and then through openings 27 in the wall of the combustion chamber 5 directly into the combustion chamber. In order to reduce heat losses, heat insulation 28 is provided on the outer casing portion 21. For operation of the gas turbine motor according to the invention, additional heat insulation is not necessary. The hot gas drives the turbine 4 and after its release is led to the heat exchanger elements 12 for giving up its residual heat to the compressed gas. The discharged exhaust gas goes through the discharge duct 17 connected to the end face 18 of the heat exchanger elements and from there, finally, to the exhaust pipe 29 from which it is blown off into the atmosphere, assuming that no further treatment is required because of the favorable discharge characteristic of a gas turbine motor.

FIG. 4 shows diagrammatically another illustrative embodiment of the gas turbine motor according to the invention, in this case a motor in which two similarly constituted component assemblies are coaxially arranged in mirror-image relation to each other. The component assemblies each correspond in their construction to a gas turbine assembly such as is shown in FIGS. 2 and 3. For this reason, the reference numerals for the individual components of the gas turbine motor of FIG. 4 are the same as for the designation of the corresponding components of FIGS. 2 and 3, so far as the components of the component assemblies are essentially identical to those of the previously described embodiments. In this case of the gas turbine motor, of FIG. 4, each of the two rings of heat exchanger elements 12 shown in the figure surrounds a turbo-unit with a centripetal turbine providing drive for compressor and vehicle. Between the two rings of heat exchanger elements is an annular (torodial) combustion chamber 5a in which the hot gas for both centripetal turbines 4a is produced. The centripetal turbines connect to the output of the annular combustion chamber 5a, and are arranged in the internal space between the rings of heat exchanger element 12 in mirror-image relation axially end-to-end in such a way that the high-pressure faces of the respective centripetal turbines face each other. In the illustrated example, both of the twin component assemblies of the gas turbine motor are designed for the same power output, so that approximately a doubling of the power output is produced compared to the gas turbine motor according to FIGS. 2 and 3. The mirror-image arrangement of the component assemblies with a common annular combustion chamber for both turbines makes possible a favorable utilization of space. Thus, there is the advantage that, along with the doubling of the power output in this arrangement, there is a smaller space requirement per energy unit produced. Preferably, the annular combustion chamber 5a is made separable at, and is bisected by, the mirroring plane 30 with respect to which the component assemblies are disposed. In this fashion, the combustion chamber is readily accessible in the assembly of one of the twin components. The joint seal of the annular combustion chamber 5a is designated in dot-dash lines in FIG. 4, while the mirroring plane 30 is shown in solid line outside the region of the combustion chamber.

In the illustrated embodiment, the two centripetal turbines 4a are coupled together by means of a slip-in axle rod 31 so that they are coupled in common, through the drive shaft 10, to a vehicle transmission 32.

FIG. 5 shows a suitable kind of heat exchanger element of ceramic material for building into a gas turbine motor in accordance with the invention. The heat exchanger element—n the shape of an annular segment—has a multiplicity of flow channels 33,34 extending most of the way between the end faces 18 and 20 and having a rectangular cross section. In each case, adjacent flow channels conduct the flow of different ones of the two media which flow in counter-current. The direction of flow of the media are respectively shown in FIG. 5 by dark and light arrows. The input openings for the media are both located on the same side (respectively at different ends) of the heat exchanger element, in the illustrated example on the side surface 16; whereas, the outflow openings for the media are in each case through an end face, respectively the end faces 18 and 20. The hot turbine discharge gas flows through the input openings 35 into the flow channels 33 of the heat exchanger element and leaves the latter through exit openings 36 in the end face 18. The compressed gas is introduced through the in-flow openings 37 to the flow channels 34 and flows out of the end face 20 to exit openings not visible in FIG. 5.

Instead of having the cross-sectional shape of a ring segment, heat exchanger elements according to FIG. 3 and FIG. 5 can also be provided with a trapezoidal cross-sectional shape. Preferably, the lateral surfaces lying against each other are at such an angle to the lateral surfaces facing the inner space enclosed by the ring that the heat exchanger elements arranged in the ring lie in contact with each other in radial planes of the ring. Heat exchanger elements of trapezoidal cross section, instead of forming a circular ring, form a polygonal ring about the components of the gas turbine motor.

Although the invention has been described with reference to particular illustrative examples, it will be understood that variations and modifications are possible within the inventive concept.

We claim:

1. A vehicular propulsion gas turbine motor comprising, in addition to the gas turbine and its upstream combustion chamber with its fuel and air supply ducts, an air input compressor driven by said gas turbine and a counter-current recuperative heat exchanger for heating the air input supplied by said compressor with heat supplied by combustion product gases discharged by said gas turbine, said turbine, compressor, combustion chamber and heat exchanger being arranged symmetrically around a common axis of symmetry that coincides with the axes of rotation of said turbine and of said compressor, and said heat exchanger being composed of a multiplicity of ceramic elements arranged in a ring around said compressor, turbine and combustion chamber with sealing means being provided between adjacent elements, said motor further comprising the improvement which consists in that:

the ceramic elements of said heat exchanger in said annular arrangement are constituted for counter-current flow of heat exchanging gases directed mainly parallel to said axis of symmetry, although both inputs thereto are perpendicular to said axis and directed from the space within said annular arrangement toward the inner side of said elements, respectively at opposite axial ends thereof, and the compressed air path connecting with said heat exchanger communicates with confined space radially beyond said heat exchanger so that said heat exchanger elements are urged inwardly by the pressure of said compressor output, and seals provided adjacent to the elements of said heat exchanger, including said seals between said elements, are improved by the effects of said pressure of said compressor output.

2. A gas turbine motor as defined in claim 1, in which said motor has a casing enclosing said confined space and surrounding and spaced from the outer surfaces of said heat exchanger elements, said confined space continuing around one end of said annular arrangement of said heat exchanger elements to communicate with the inwardly directed compressed gas input duct for said combustion chamber.

3. A gas turbine motor as defined in claim 2 in which said heat exchanger elements are embedded in sealing means of ceramic fiber material filling the space between the places where said elements are adjacent to the respective ducts supplying compressed gas and exhaust gas, and near where said elements face the portion of said casing surrounding said heat exchanger elements and in which, further, said casing portion serves to guide the heated compressed gas from the one end of said heat exchanger elements to said combustion chamber.

4. A gas turbine motor as defined in claim 3 in which heat insulation is provided on said casing portion surrounding said heat exchanger elements.

5. A gas turbine motor as defined in claim 3 in which centering means are provided on said casing portion fitting into cavities provided on the surface of said heat exchanger elements facing said casing portion.

6. A gas turbine motor as defined in claim 3 in which resilient positioning means are provided between said casing portion and the outer surfaces of said heat exchanger elements.

7. A gas turbine motor as defined in claim 3, in which said heat exchanger elements each have a cross section in the shape of a segment of a ring.

8. A gas turbine motor as defined in claim 3, in which said heat exchanger elements each have a trapezoidal cross section.

9. A gas turbine motor as defined in claim 3 in which the compressed gas input to said heat exchanger elements and the exhaust gas ducts connecting with the heat exchanger elements are connected to said heat exchanger elements by means of sealing means automatically effective in response to pressure of the compressed gas.

10. A gas turbine motor as defined in claim 3 in which said heat exchanger elements are arranged in a pair of rings comprising a first ring of heat exchanger elements followed by a second ring coaxial with the first, axially spaced therefrom, and in mirror-image relation thereto, and in which motor, further, an annular combustion chamber is provided between the two rings of heat exchanger elements and two turbine assemblies are arranged in mirror-image relation to each other about said axis of symmetry, each surrounded by one rim of heat exchanger elements and each with a centripetal turbine for respectively driving the vehicle drive shaft and the compressor individual to the particular turbine assembly, the centripetal turbines of both turbine assemblies being mounted rotatably in the inner spaces between the heat exchanger elements in mutual mirror-image arrangement in such a way that the high pressure faces of the centripetal turbines face each other.

11. A gas turbine motor as defined in claim 10 in which said annular combustion chamber is separable substantially at the mirror-image relation plane separating the two centripetal turbines arranged in mirror-image relation to each other, which plane substantially bisects said combustion chamber.

12. A gas turbine motor as defined in claim 10 or claim 11 in which there are provided coupling means including a slip-in axle stub for intercoupling the centripetal turbines.

* * * * *